United States Patent [19]

Hsieh

[11] Patent Number: 5,001,347

[45] Date of Patent: Mar. 19, 1991

[54] FOCUSSING COLLIMATORS FOR USE IN ROTATIONAL CAMERA TRANSAXIAL SPECT IN WHICH THE CAMERA HEAD IS INCLINED WITH RESPECT TO THE AXIS OF ROTATION

[75] Inventor: Jiang Hsieh, Hanover Park, Ill.

[73] Assignee: Siemens Gammasonics, Inc., Hoffman Estates, Ill.

[21] Appl. No.: 413,344

[22] Filed: Sep. 27, 1989

[51] Int. Cl.$^5$ .............................................. G01T 1/166
[52] U.S. Cl. ............................ 250/363.10; 250/505.1; 378/149
[58] Field of Search ........... 250/363.10, 505.1, 363.02; 378/149, 156

[56] References Cited

U.S. PATENT DOCUMENTS

| | | | |
|---|---|---|---|
| 4,081,687 | 3/1978 | York et al. | 250/363.10 |
| 4,670,657 | 6/1987 | Hawman et al. | 250/363.10 |
| 4,820,924 | 4/1989 | Hsieh | 250/363.10 |
| 4,823,017 | 4/1989 | Hsieh | 250/363.10 |

OTHER PUBLICATIONS

*Journal of Nuclear Medicine*, vol. 29, pp. 1398–1405, Aug., 1988.
*Phys. Med. Biol.*, vol. 34, No. 5, pp. 625–631, 1989.
*Medical Physics*, vol. 13, No. 4, July/Aug., 1986, pp. 484–489.
Memo from W. White to Rick Ryba dated Jun. 30, 1986.

Primary Examiner—Jack I. Berman
Assistant Examiner—Richard Hanig
Attorney, Agent, or Firm—Mark H. Jay

[57] ABSTRACT

A collimator is designed for use in rotational camera transaxial SPECT in which the camera head is inclined with respect to the axis of rotation. The principal ray of the collimator is offset so that the transaxial plane bisects the angle bounded by the radially outermost collimated rays (cone-beam case) or by the radially outermost fan strips (astigmatic and anamorphic cases.)

3 Claims, 4 Drawing Sheets

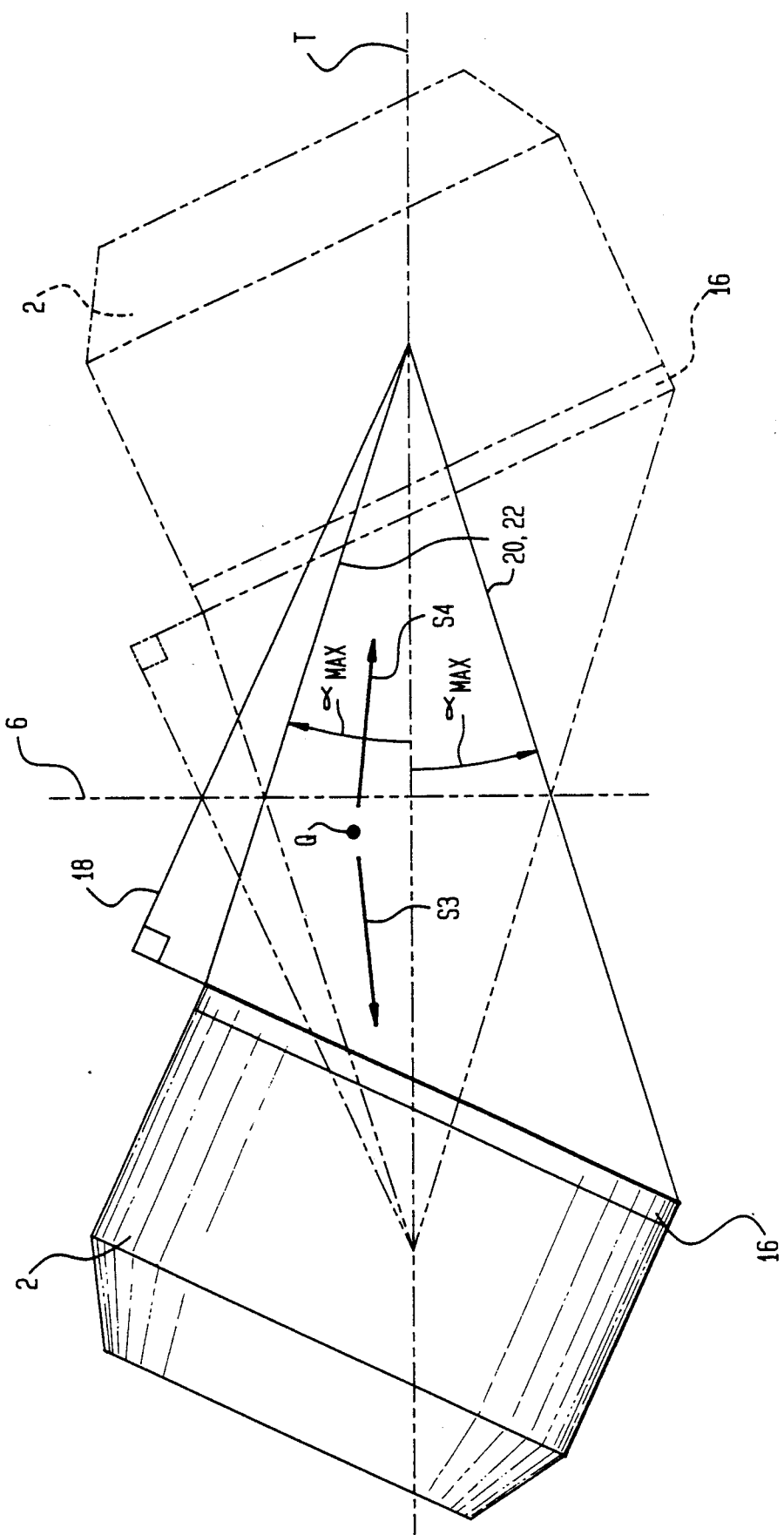

FOCUSSING COLLIMATORS FOR USE IN ROTATIONAL CAMERA TRANSAXIAL SPECT IN WHICH THE CAMERA HEAD IS INCLINED WITH RESPECT TO THE AXIS OF ROTATION

BACKGROUND OF THE INVENTION

The invention relates to collimators, and more particularly relates to focussing collimators for use in single photon computerized tomography, or SPECT. In its most particular sense, the invention relates to focussing collimators for use in SPECT examinations of the head.

U.S. Pat. No. 4,670,657 discloses an astigmatic collimator which is well adapted to such examinations. Cone beam collimators are also well adapted to such examinations. However, as is set forth in U.S. Pat. No. 4,670,657, it is advantageous to incline the sensitive crystal surface with respect to the axis of rotation during a SPECT (single photon emission computerized tomography) examination. This reduces the variation in the gap between the patient's brain and the sensitive crystal surface.

When the camera head is so tilted, and especially at inclinations of 25 to 30 degrees, it has been found that artifacts are introduced in the reconstructed tomographic image. These artifacts are undesirable.

One object of the invention is to provide a focussing collimator which may be inclined with respect to the axis of rotation during SPECT without causing excessive artifacts to arise in the reconstructed image.

Another object is to improve on existing cranial scanning techniques and apparatus.

In accordance with the invention, an astigmatic, cone-beam or anamorphic collimator is provided in which the principal ray is offset so that, during rotational camera transaxial SPECT in which the camera head is inclined with respect to the axis of rotation, the transaxial plane bisects the angle bounded by the two radially outermost fan strips (in the case of astigmatic and anamorphic collimators) and the angle bounded by the two radially outermost collimated rays (in the case of a cone-beam collimator).

This reduces the maximum inclination of a collimated ray with respect to the transaxial plane. As a result of this reduction, reconstruction artifacts are reduced to a level at which they are masked by the ambient noise level which is inherent in all scintillation camera systems.

BRIEF DESCRIPTION OF THE DRAWINGS

Exemplary and non-limiting preferred embodiments of the invention are shown in the drawings, in which:

FIG. 7 illustrates the reason why the preferred embodiment reduces the incidence of artifacts in the reconstructed tomographic image.

DETAILED DESCRIPTION OF PREFERRED EMBODIMENTS

Figure 1:
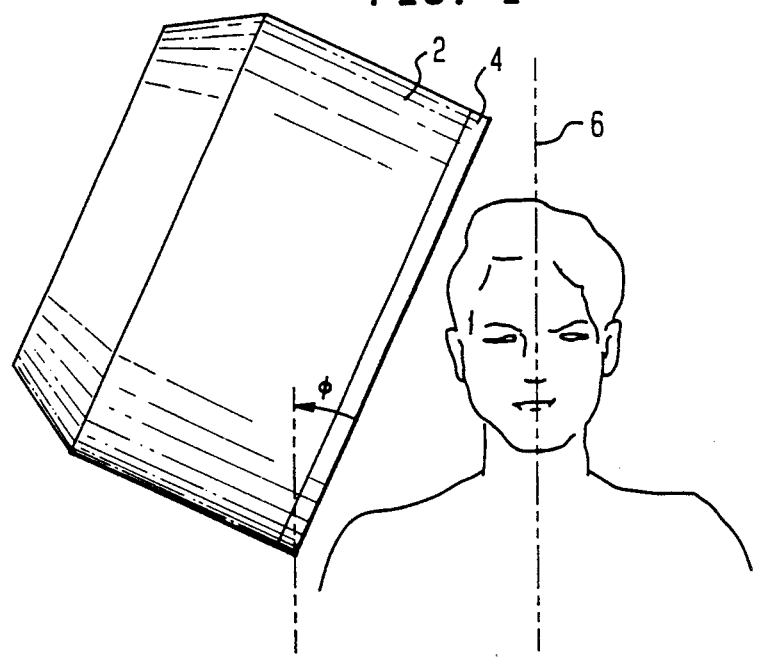
FIG. 1 shows how a focussing collimator may be inclined with the SPECT axis of rotation.

FIG. 1 shows that a scintillation camera head 2 with attached collimator 4 may advantageously be tilted with respect to the axis of rotation 6 during transaxial rotational camera SPECT. The tilt angle $\phi$ is advantageously, although not necessarily, 20 to 30 degrees, 25 degrees being presently preferred.

Figure 2:
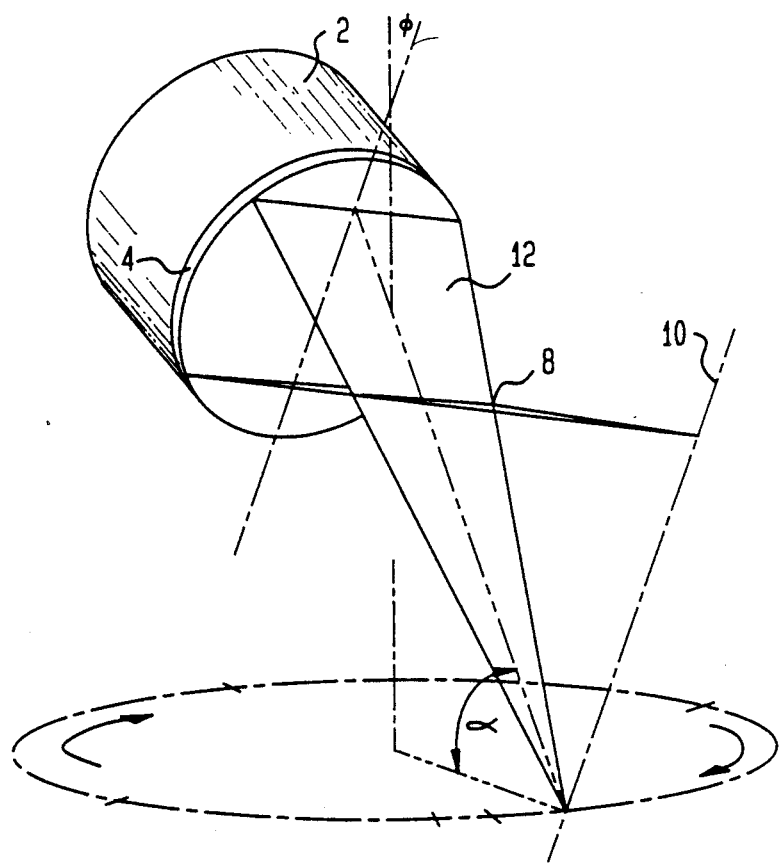
FIG. 2 is a schematic illustration of the geometry of an anamorphic collimator.
Figure 3:
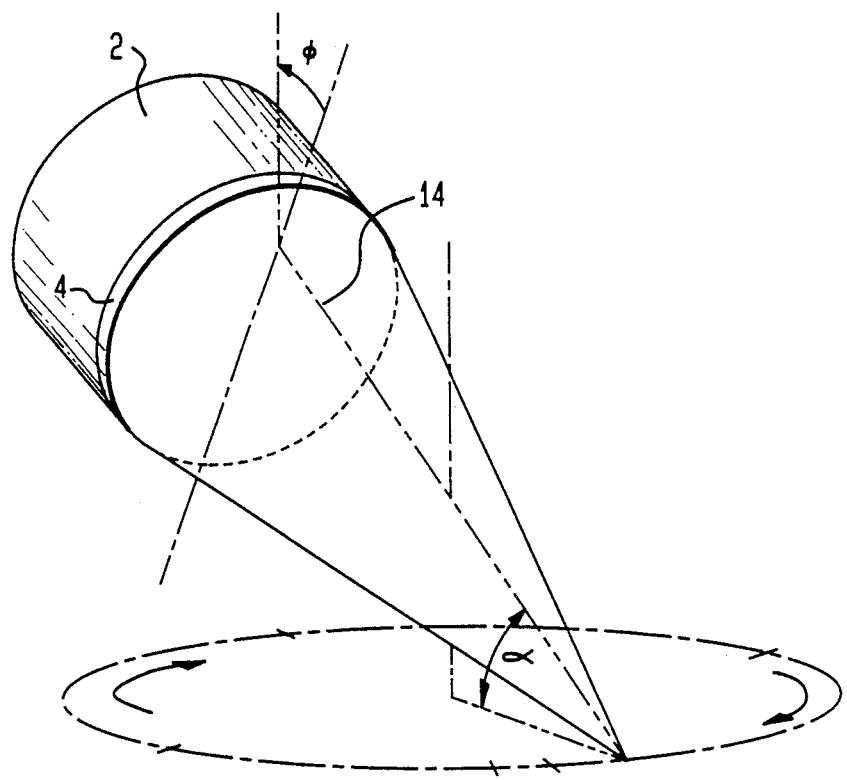
FIG. 3 is a schematic illustration of the geometry of a cone-beam collimator.

FIGS. 2 and 3 show the geometry of the foregoing arrangement with, respectively, anamorphic collimators and cone-beam collimators. (FIG. 2 is also illustrative of an astigmatic collimator; the angle between the two focal lines 8 and 10 is not a part of this invention.) In both cases, the radially outermost fan strip (12, in FIG. 2) of the anamorphic collimator and the radially outermost collimated ray (14, in FIG. 3) of the cone-beam collimator make a relatively large angle $\alpha$ with respect to the transaxial plane T.

Figure 4:
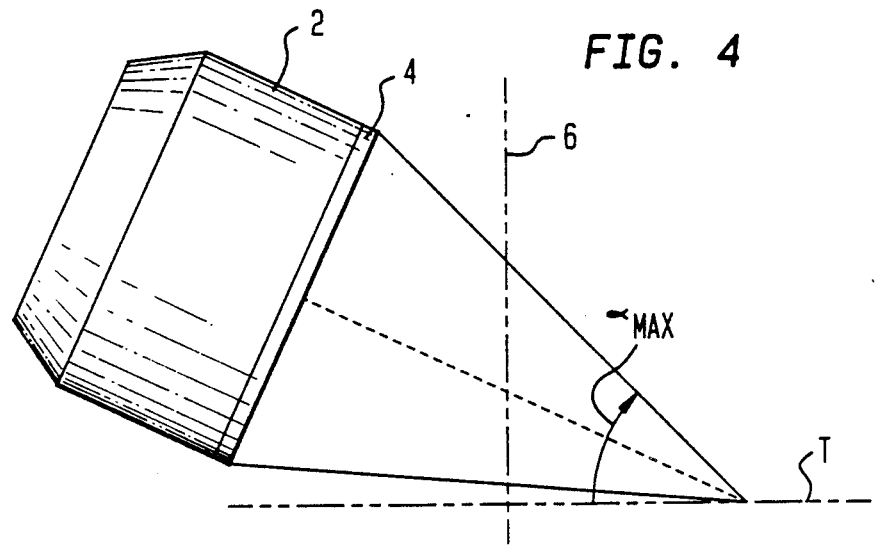
FIGS. 4 and 5 schematically illustrate the reason why an inclined focussing collimator produces artifact-containing tomographic images.

This large angle $\alpha$, which is more clearly illustrated for both the FIG. 2 and FIG. 3 cases in FIG. 4, is the cause of image artifacts. This is because there will be many points in the imaged object (the patient's head) for which a complete sample in Fourier space is lacking, as is explained in connection with FIG. 5.

Figure 5:
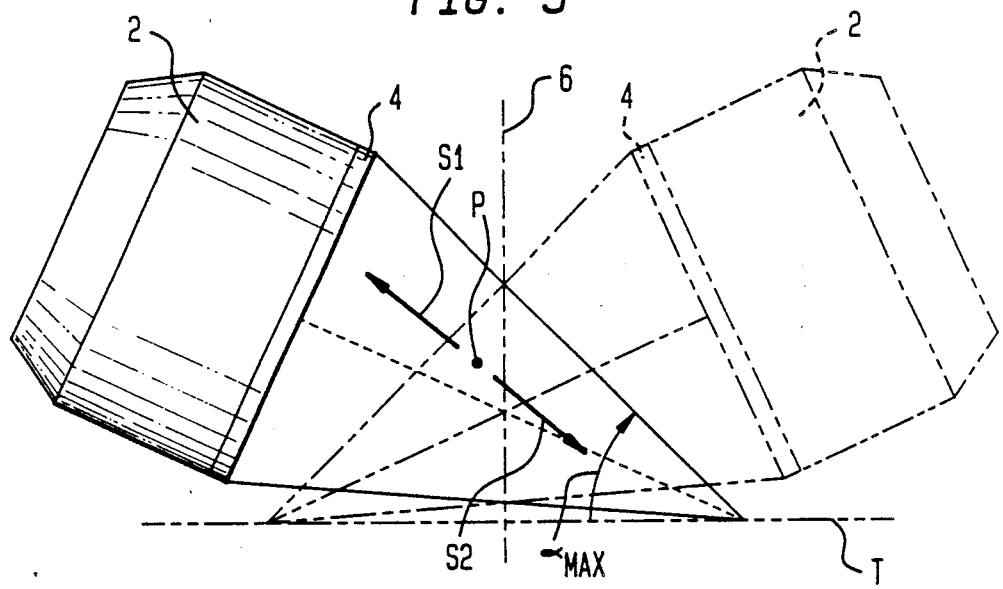

As an example, the point in FIG. 5 is visible along collimated ray S1 from the top left when the camera is in the left-hand position shown, but is not visible from the bottom right when the camera is in the right-hand position shown because an oppositely-directed collimated ray S2 does not exist. Consequently, the data set for the point P is deficient and the deficiency will be reflected in the reconstructed tomographic image which includes the point P. (It can be shown that the level of this deficiency increases quickly as the angle $\alpha$ increases.) As a result, while use of an anamorphic or astigmatic or cone-beam collimator 4 increases camera sensitivity, the end product of such use is an artifact-containing tomographic image. This is disadvantageous.

Figure 6:
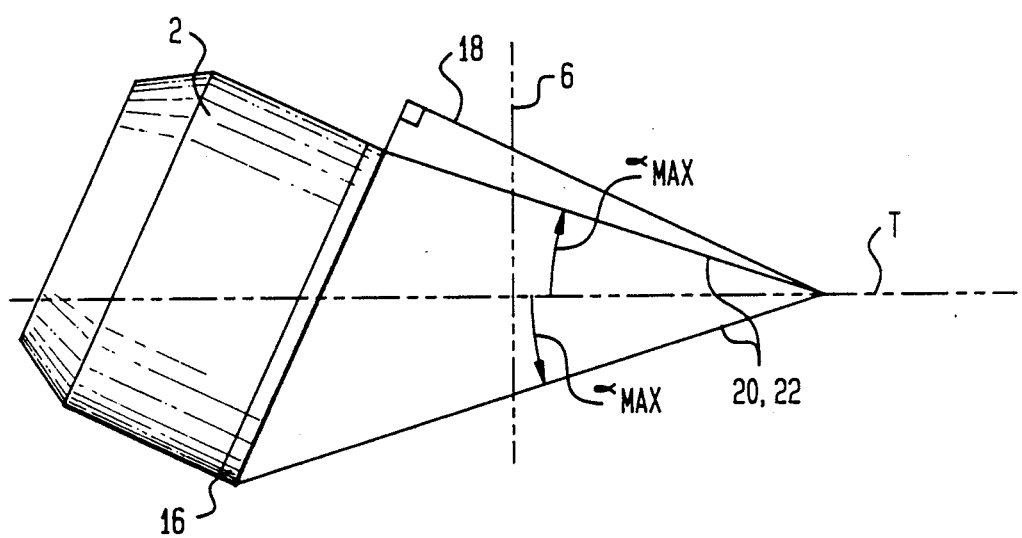
FIG. 6 is an illustration of a preferred embodiment of the invention.

In accordance with the invention, an astigmatic, anamorphic or cone-beam collimator 16 is so designed that, during rotational camera transaxial SPECT with the head 2 inclined with respect to the axis of rotation 6, its principal ray 18 (a ray perpendicular to the sensitive crystal surface) is offset by an amount which is sufficient to cause the transaxial plane T to bisect the angles formed by the radially outermost fan strips 20 (astigmatic and anamorphic cases) and collimated rays 22 (cone-beam case). This is illustrated, for all the above cases, in FIG. 6. As can be seen in FIG. 7, the consequence of the bisection is that a complete data set is acquired for many more points inside the imaged object, reducing the incidence of artifacts. For example, the point Q can be viewed along collimated ray S3 when the camera 2 is in the left-hand position and along collimated ray S4 when the camera is in the right-hand position, and S3 and S4 are almost oppositely directed. (In a physical sense, the invention reduces $\alpha$MAX, the maximum angle $\alpha$, as can be seen by comparing $\alpha$MAX in FIGS. 6 and 7 with $\alpha$MAX in FIGS. 4 and 5.) While there are points for which a complete data set is unavailable, simulations indicate that such artifacts are masked by ambient noise levels and that they consequently are not significant in the reconstructed tomographic image.

Those skilled in the art will understand that changes can be made in the preferred embodiments here described, and that these embodiments can be used for other purposes. Such changes and uses are within the scope of the invention, which is limited only by the claims which follow.

I claim:

1. An astigmatic collimator for use in rotational camera transaxial SPECT with the camera head inclined with respect to the axis of rotation, the collimator having two radially outermost fan strips and a principal ray which is perpendicular to the surface of a scintillation camera head to which the collimator is to be attached, said principal ray being so offset that the transaxial plane bisects the angle bounded by the two radially outermost fan strips.

2. An anamorphic collimator for use in rotational camera transaxial SPECT with the camera head inclined with respect to the axis of rotation, the collimator having two radially outermost fan strips and a principal ray which is perpendicular to the surface of a scintillation camera head to which the collimator is to be attached, said principal ray being so offset that the transaxial plane bisects the angle bounded by the two radially outermost fan strips.

3. A cone-beam collimator for use in rotational camera transaxial SPECT with the camera head inclined with respect to the axis of rotation, the collimator having an axis which is so offset that the transaxial plane bisects the angle bounded by the two radially outermost collimated rays.

* * * * *